(12) United States Patent
Clark et al.

(10) Patent No.: US 9,426,278 B2
(45) Date of Patent: Aug. 23, 2016

(54) LOCATION BASED MOBILE COMMUNICATIONS DEVICE AUTO-CONFIGURATION

(75) Inventors: Mark Clark, Aptos, CA (US); Steve Evans, Aptos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 655 days.

(21) Appl. No.: 12/874,160

(22) Filed: Sep. 1, 2010

(65) Prior Publication Data

US 2012/0051262 A1    Mar. 1, 2012

(51) Int. Cl.
*H04L 12/28* (2006.01)
*H04M 1/725* (2006.01)
*H04M 1/60* (2006.01)

(52) U.S. Cl.
CPC ........ *H04M 1/72572* (2013.01); *H04M 1/7253* (2013.01); *H04M 1/6066* (2013.01)

(58) Field of Classification Search
CPC ........................ H04M 1/7253; H04M 1/72572
USPC ......... 370/254; 455/406, 456.3, 404.1, 404.2, 455/435.1, 445; 709/217–229
See application file for complete search history.

(56) References Cited

U.S. PATENT DOCUMENTS

| | | | | |
|---|---|---|---|---|
| 6,131,040 | A * | 10/2000 | Knuutila et al. | 455/550.1 |
| 7,260,395 | B1 | 8/2007 | Hughes et al. | |
| 7,272,494 | B2 * | 9/2007 | Murray et al. | 701/484 |
| 7,363,041 | B2 * | 4/2008 | Bonnard et al. | 455/456.1 |
| 7,787,863 | B2 * | 8/2010 | van de Groenendaal | 455/411 |
| 7,796,979 | B2 * | 9/2010 | Adams et al. | 455/418 |
| 7,983,668 | B2 * | 7/2011 | Tiernan | 455/423 |
| 8,504,107 | B2 * | 8/2013 | Wang et al. | 455/558 |
| 2003/0162539 | A1 * | 8/2003 | Fiut et al. | 455/424 |
| 2005/0282544 | A1 | 12/2005 | Oommen et al. | |
| 2006/0008059 | A1 * | 1/2006 | Ying et al. | 379/88.17 |
| 2007/0004463 | A1 * | 1/2007 | Clark | G06F 3/16 455/569.1 |
| 2007/0004473 | A1 * | 1/2007 | Clark | H04M 1/2535 455/575.2 |
| 2007/0115950 | A1 * | 5/2007 | Karaoguz et al. | 370/356 |
| 2007/0115951 | A1 * | 5/2007 | Karaoguz et al. | 370/356 |
| 2007/0117571 | A1 * | 5/2007 | Musial | 455/456.1 |
| 2007/0230420 | A1 | 10/2007 | Bumiller | |
| 2008/0112554 | A1 * | 5/2008 | Arnold | H04M 1/006 379/201.03 |
| 2008/0232272 | A1 * | 9/2008 | Gelbman et al. | 370/254 |
| 2008/0244148 | A1 * | 10/2008 | Nix et al. | 710/313 |
| 2009/0023434 | A1 | 1/2009 | Trainor et al. | |
| 2009/0117945 | A1 * | 5/2009 | Mahler et al. | 455/569.1 |
| 2009/0253410 | A1 * | 10/2009 | Fitzgerald | G06F 21/88 455/411 |
| 2009/0323673 | A1 * | 12/2009 | Gabbay et al. | 370/352 |
| 2010/0008255 | A1 * | 1/2010 | Khosravy et al. | 370/254 |
| 2010/0033312 | A1 * | 2/2010 | Chauncey et al. | 340/438 |
| 2010/0081418 | A1 * | 4/2010 | Chiashi | H04M 1/0241 455/414.1 |
| 2010/0085935 | A1 | 4/2010 | Chin | |
| 2010/0191837 | A1 * | 7/2010 | Linden et al. | 709/220 |
| 2011/0130118 | A1 * | 6/2011 | Fan | H04M 15/00 455/411 |
| 2011/0159878 | A1 * | 6/2011 | Bender et al. | 455/445 |
| 2011/0207503 | A1 * | 8/2011 | Ruperto | H04W 48/18 455/552.1 |
| 2011/0294472 | A1 * | 12/2011 | Bramwell | H04W 8/04 455/413 |
| 2011/0306367 | A1 | 12/2011 | Cahill | |
| 2011/0312314 | A1 | 12/2011 | Cahil | |
| 2012/0034937 | A1 | 2/2012 | Cahill | |
| 2014/0043963 | A1 * | 2/2014 | Russell et al. | 370/228 |

* cited by examiner

*Primary Examiner* — Khaled Kassim
*Assistant Examiner* — Syed S Ali
(74) *Attorney, Agent, or Firm* — Chuang Intellectual Property Law

(57) ABSTRACT

Methods and apparatuses for mobile communication device configuration are disclosed. In one example, communications are established with a computing device and a use region is identified. A mobile communication device configuration profile is selected corresponding to the use region and implemented at a mobile communication device.

22 Claims, 10 Drawing Sheets

900

| Frequency | Carriers/Channel Usage Requirements to reflect UPCS requirements | Average Transmit Power |
|---|---|---|
| 1920 MHz-1930 MHz | 5 at 1728 kHz spacing | 4 mW (100 mW peak) |

| Frequency | Carriers/Channel Usage Requirements to reflect ETSI requirements | Average Transmit Power |
|---|---|---|
| 1880 MHz-1900 MHz | 10 at 1728 kHz spacing | 10 mW (250 mW peak) |

| Region | Frequency | Channel Usage Requirements |
|---|---|---|
| U.S./Canada | 1920 MHz-1930 MHz | Per FCC/ANSI |
| Europe | 1880 MHz-1900 MHz | Per ETSI |
| China | 1900 MHz-1920 MHz | Per CQC/SRRC |
| Latin America | 1910 MHz-1930 MHz | Per AVETEL/ COFETEL |
| . . . | . . . | . . . |
| . . . | . . . | . . . |

LOCATION BASED MOBILE COMMUNICATIONS DEVICE AUTO-CONFIGURATION

BACKGROUND OF THE INVENTION

The convenient portability of mobile communication devices such as headsets allows users to carry and use these devices while travelling. However, operation of these devices may be governed by different regulations based upon the current use location. For example, the frequency band allocated for use may differ based on country of use.

Furthermore, global manufacturing and shipping allows manufacturers to sell the mobile communication devices worldwide in different countries. In the prior art, these mobile communication devices must be configured by the manufacturer prior to use in the desired country. The configuration is performed by the manufacturer prior to shipment. Unauthorized resellers may sell devices configured for one region in a different region, with such devices often referred to as gray market goods. As with the transport by users of legitimate devices from one country to another, these gray market devices may not be in compliance with local regulations when used in unintended location.

As a result, improved methods and apparatuses for mobile communication device configuration are needed.

BRIEF DESCRIPTION OF THE DRAWINGS

The present invention will be readily understood by the following detailed description in conjunction with the accompanying drawings, wherein like reference numerals designate like structural elements.

FIG. 9A illustrates a region configuration profile for a DECT system in the United States region.

FIG. 9B illustrates region configuration profile for a DECT system in the Europe region.

FIG. 10 illustrates variation in operating frequency band for a DECT system in several regions.

DESCRIPTION OF SPECIFIC EMBODIMENTS

Figure 1:
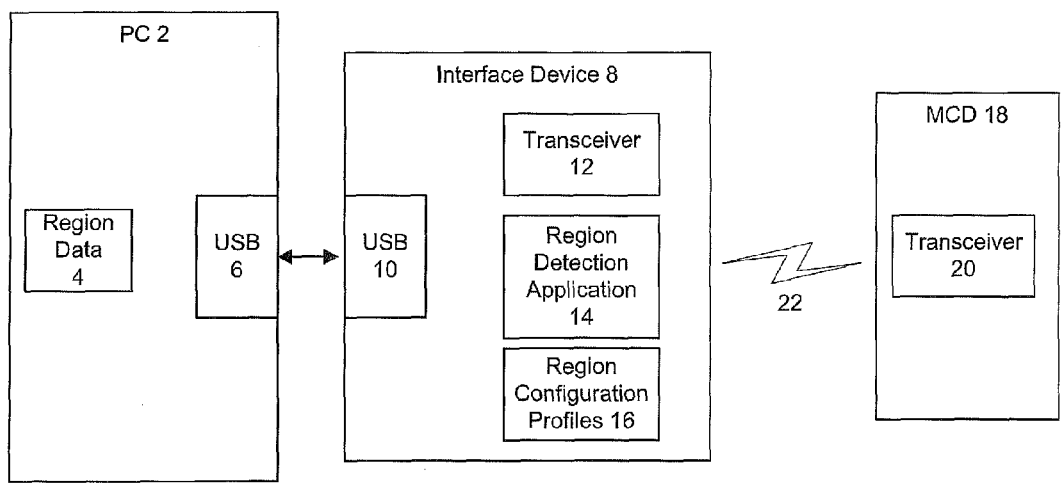
FIG. 1 illustrates a system for configuration of a mobile communication device in one example.

Methods and apparatuses for mobile communication device configuration are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

This invention relates to automatic configuration of mobile communication devices. In one example, a mobile communication device configuration unit includes a data interface adapted to interface with a computing device coupled to a communications network and a transceiver configured for wireless communications with a mobile communication device. The configuration unit further includes a memory storing one or more region configuration profiles. The mobile communication device configuration unit is adapted to detect region data from the computing device and responsively select a region configuration profile from among the one or more region configuration profiles. Thus, the mobile communication device is advantageously automatically configured to match desired or required settings based on location.

In one example, a method for configuration of a mobile communication device includes establishing communications with a computing device and identifying a use region from the computing device. A mobile communication device configuration profile is selected corresponding to the use region and implemented at a mobile communication device.

In one example, a self-configuring mobile communication device includes a processor, a microphone, a speaker, and a wireless transceiver adapted for communications with a base unit utilizing a wireless communications protocol. The mobile communication device further includes a memory storing one or more configuration profiles and a configuration application adapted to select and implement a configuration profile from the one or more configuration profiles responsive to a data retrieval from the base unit.

In one example, a system includes a mobile communication device such as a headset and a configuration/communication unit such as a USB dongle. The mobile communication device is auto-configured to an appropriate standard using information that is obtained from the network that the PC that is hosting the USB dongle is on. Time zone, user information, and country code identifier information from the PC may be utilized to determine if the settings in the USB dongle and mobile communication device are appropriate for that location. Under good signal conditions the USB dongle issues an over-the-air batch file to configure the mobile communication device correctly, then issues a reset command to activate the change. After sending new configuration information to the mobile communication device, the USB dongle will modify its configuration to match and then registration takes place between the USB dongle and the mobile communication device for security purposes to complete the process.

FIG. 1 illustrates a system for configuration of a mobile communication device in one example. The system includes a computing device such as a personal computer (PC) 2, an interface device 8, and a mobile communication device 18. Mobile communication device 18 may, for example, be a wireless headset having a transceiver 20. PC 2 stores region data 4 indicating the region of operation and includes a Universal Serial Bus (USB) interface 6. PC 2 may be coupled to a communications network such as an Internet Protocol (IP) network or cellular communications network.

Interface device 8 includes a USB interface 10 which may be removably coupled to the USB interface 6 at PC 2, and a transceiver 12 configured for wireless communications with the mobile communication device 18. Interface device 8 further includes a region detection application 14 and stores region configuration profiles 16 in memory. Interface device 8 may, for example, be a portable USB dongle. In further examples, interface device 8 may utilize a PCMCIA, IEEE 1394, or any other type of data interface, proprietary or otherwise, to connect to PC 2. In a further example, region detection application 14 may reside on PC 2.

In operation, interface device 8 is adapted to detect region data 4 from the PC 2 and responsively select a region configuration profile from among the region configuration profiles 16. The interface device 8 transmits the selected region configuration profile to the mobile communication device 18 via the transceiver 12. For example, region detection application 14 may perform these functions. The interface device 8 reconfigures settings at the interface device 8 following selection of the region configuration profile to match the selected profile. The mobile communication device 18 receives the selected region configuration profile and implements the profile settings.

In one example, transceiver 12 and transceiver 20 communicate over a wireless link 22 utilizing a Digital Enhanced Cordless Telecommunications (DECT) protocol. In a further example, transceiver 12 and transceiver 20 communicate over a wireless link 22 utilizing a Bluetooth protocol. In further examples, transceiver 12 and transceiver 20 may utilize additional wireless communication protocols, including IEEE 802.11 protocols.

Figure 2:
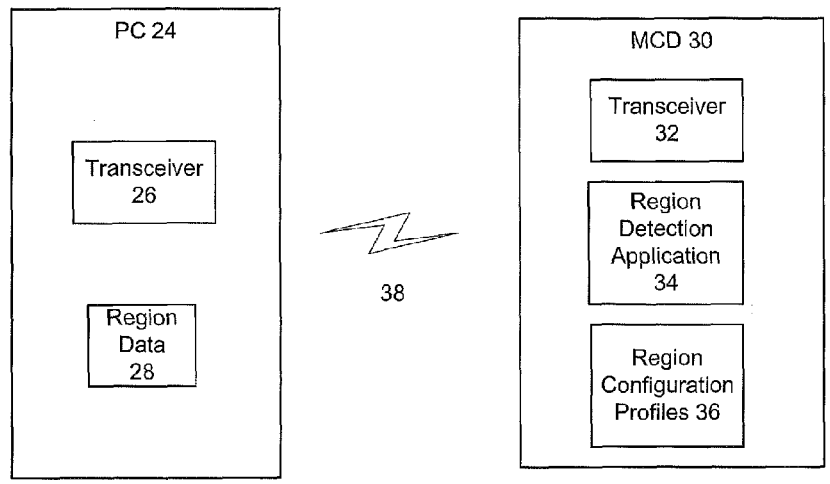
FIG. 2 illustrates a system for configuration of a mobile communication device in a further example.

FIG. 2 illustrates a system for configuration of a mobile communication device in a further example. The system in FIG. 2 includes a computing device such as a personal computer (PC) 24 and mobile communication device 30. The computing device may itself be a mobile communication device, such as a laptop computer or mobile phone. PC 24 includes a transceiver 26 and stores region data 28. Region data 28 may include any type of location data. In certain examples described herein, the location data is country or continent information. In further examples, the location data may include location information such as whether the computing device is at a location corresponding to a user home, a user office, an airport or airplane, a moving vehicle, or public or private location. Thus, the term "region" is used interchangeably with the term "location" herein.

In this example, mobile communication device 30 includes a transceiver 32, a region detection application 34, and stores region configuration profiles 36. In operation, mobile communication device 30, utilizing region detection application 34, detects region data 28 from the PC 24 and responsively selects a region configuration profile from among the region configuration profiles 36. The mobile communication device 30 then implements the settings for the selected region configuration profile. In a further example, the region detection application 34 may reside on PC 24.

Figure 3A:
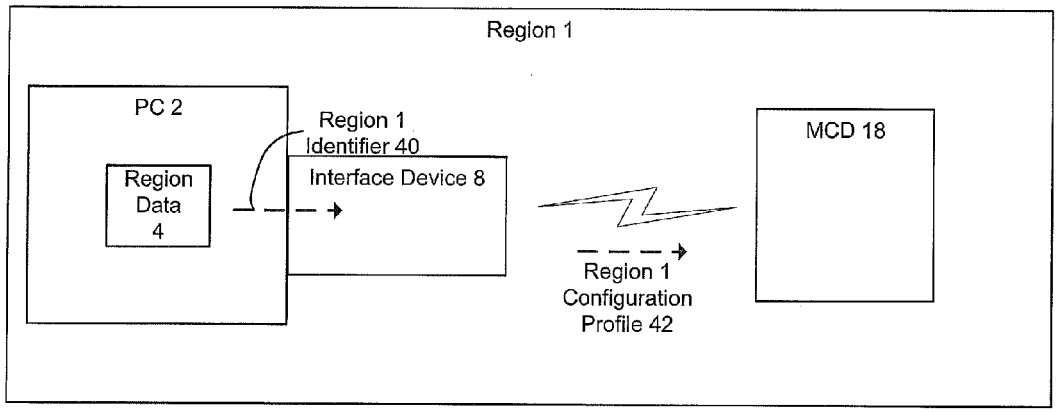
FIG. 3A illustrates configuration of a mobile communication device in a first region in one example of the system shown in FIG. 1.

FIG. 3A illustrates configuration of a mobile communication device in a first region in one example of the system shown in FIG. 1. In the example shown in FIG. 3A, PC 2 is located in a Region 1 and mobile communication device 18 must therefore be configured for operation in Region 1 if it is not so currently configured. Following coupling of interface device 8 to PC 2, interface device 8 scans region data 4 and locates Region 1 Identifier 40. Based on Region 1 Identifier 40, interface device 8 selects a Region 1 Configuration Profile 42 and transmits this profile to mobile communication device 18 for reconfiguration of mobile communication device 18.

Figure 3B:
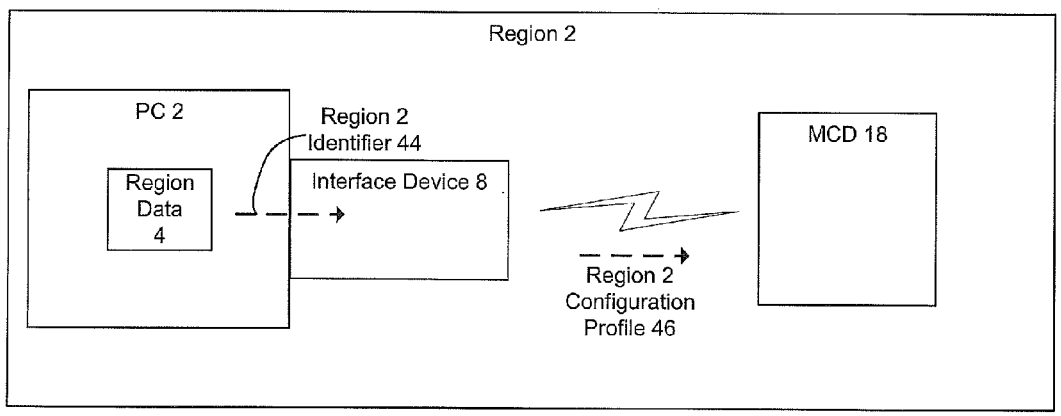
FIG. 3B illustrates configuration of a mobile communication device in a second region in one example of the system shown in FIG. 1.

FIG. 3B illustrates configuration of a mobile communication device in a second region in one example of the system shown in FIG. 1. In the example shown in FIG. 3B, PC 2 is located in a Region 2 and mobile communication device 18 must therefore be configured for operation in Region 2 if it is not so currently configured. Following coupling of interface device 8 to PC 2, interface device 8 scans region data 4 and locates Region 2 Identifier 44. Based on Region 2 Identifier 44, interface device 8 selects a Region 2 Configuration Profile 46 and transmits this profile to mobile communication device 18 for reconfiguration of mobile communication device 18.

Figure 4A:
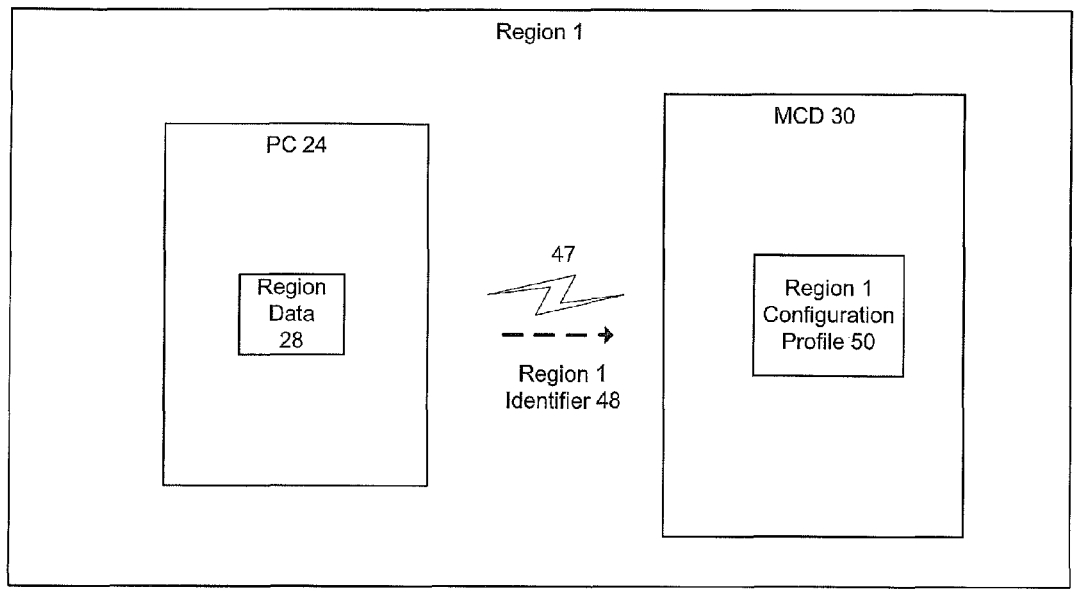
FIG. 4A illustrates configuration of a mobile communication device in a first region in one example of the system shown in FIG. 2.

FIG. 4A illustrates configuration of a mobile communication device in a first region in one example of the system shown in FIG. 2. In the example shown in FIG. 4A, PC 24 is located in a Region 1 and mobile communication device 30 must therefore be configured for operation in Region 1 if it is not so currently configured. Following formation of a wireless link 47 to PC 24, mobile communication device 30 scans region data 28 and locates/retrieves Region 1 Identifier 48. Based on Region 1 Identifier 48, mobile communication device 30 selects and implements a Region 1 Configuration Profile 50 stored at mobile communication device 30.

Figure 4B:
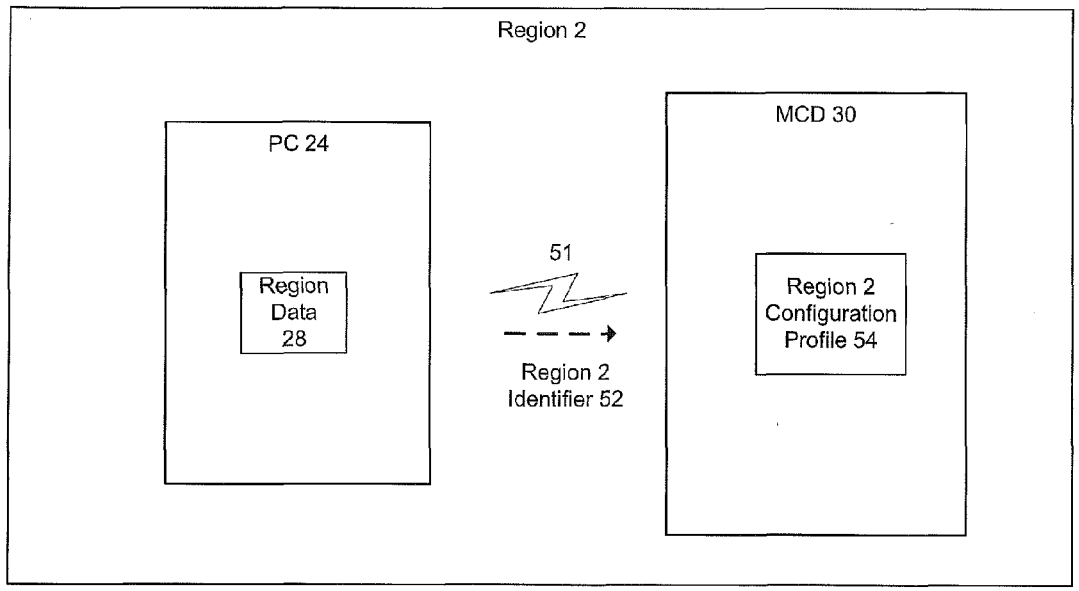
FIG. 4B illustrates configuration of a mobile communication device in a second region in one example of the system shown in FIG. 2.

FIG. 4B illustrates configuration of a mobile communication device in a second region in one example of the system shown in FIG. 2. In the example shown in FIG. 4B, PC 24 is located in a Region 2 and mobile communication device 30 must therefore be configured for operation in Region 2 if it is not so currently configured. Following formation of a wireless link 51 to PC 24, mobile communication device 30 scans region data 28 and locates/retrieves Region 2 Identifier 52. Based on Region 2 Identifier 52, mobile communication device 30 selects and implements a Region 2 Configuration Profile 54 stored at mobile communication device 30.

Figure 5:
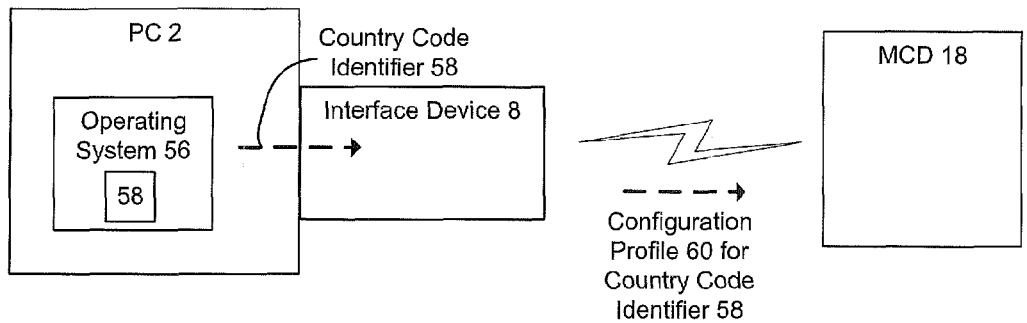
FIG. 5 illustrates automatic identification of a use region using a country code identifier in one example of the system shown in FIG. 1.

FIG. 5 illustrates automatic identification of a use region using a country code identifier in one example of the system shown in FIG. 1. In the example shown in FIG. 5, PC 2 includes an operating system 56 storing region data including a Country Code Identifier 58 which is retrieved by the interface device 8. Based on Country Code Identifier 58, interface device 8 selects a Configuration Profile 60 and transmits this profile to mobile communication device 18 for configuration of mobile communication device 18. In one example, operating system 56 is a Microsoft Windows™ operating system such as Windows 7™ which stores country code identifiers indicating the country of use.

Figure 6:
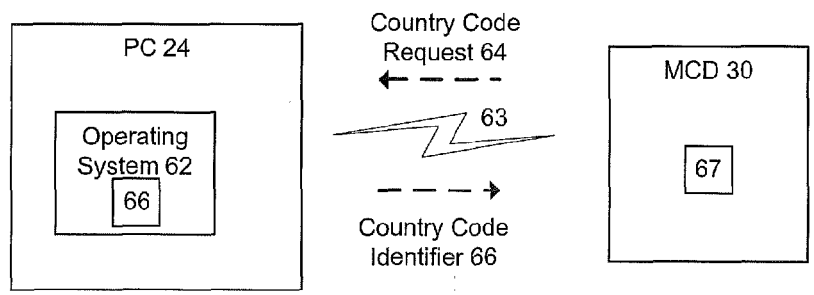
FIG. 6 illustrates automatic identification of a use region using a country code identifier in one example of the system shown in FIG. 2.

FIG. 6 illustrates automatic identification of a use region using a country code identifier in one example of the system shown in FIG. 2. In the example shown in FIG. 6, PC 24 includes an operating system 62 storing region data including a Country Code Identifier 66. Following formation of a wireless communication link 63 to PC 24, mobile communication device 30 transmits a country code request 64 to operating system 62. In response, mobile communication device 30 receives Country Code Identifier 66. Based on Country Code Identifier 66, mobile communication device 30 selects and implements a Configuration Profile 67 previously stored at mobile communication device 30.

Figure 7:
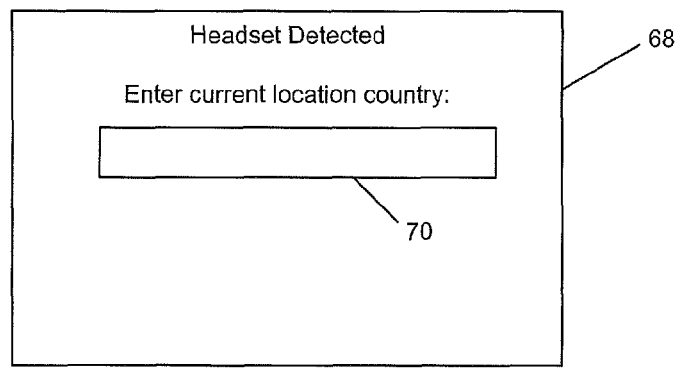
FIG. 7 illustrates identification of a use region utilizing user input.

FIG. 7 illustrates identification of a use region utilizing user input. In certain instances, interface device 8 or mobile communication device 30 may be unable to automatically detect region data from either personal computer 2 or personal computer 24, respectively. In such instances, the user is advantageously provided with the option of manually entering the current user location (e.g., region or country of use). In the example shown in FIG. 7, a screen shot 68 is shown requesting user input of the current location country using a text entry field 70. In one example, a screen shot 68 may be displayed at PC 2 or PC 24. In a further example, a screen shot 68 may be displayed at mobile communication device 18 or mobile communication device 30. Following entry by the user of the current region or country, selection and implementation of the appropriate region configuration profile is performed automatically as described in the above examples.

In certain examples, a configuration profile may include region specific radio compliance settings, region specific safety compliance settings, or security settings. In further examples, other categories of settings may be included in the configuration profile. A configuration profile may include one category of settings or a combination of several categories of settings.

Figure 8A:
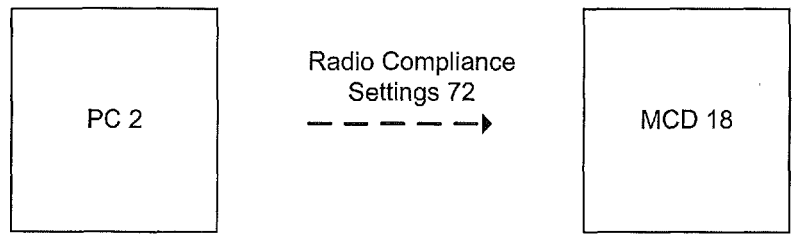
FIG. 8A illustrates transmission of radio compliance settings from a computing device to a mobile communication device.

FIG. 8A illustrates transmission of radio compliance settings 72 from a PC 2 to a mobile communication device 18. In one example, the radio compliance settings 72 may include operating characteristics such as the frequency band of operation of the mobile communication device 18, number of carriers or channels utilized by the mobile communication device 18, or transmit power of the mobile communication device 18. The operating characteristics may be based on regulatory requirements in the country of use.

FIG. 9A illustrates a region configuration profile 900 complying with the requirements for a DECT system in the United States to reflect Unlicensed Personal Communications Services (UPCS) requirements, whereby the mobile communication device is configured to operate in a frequency band of operation between 1920-1930 MHz, utilize five carriers having 1728 kHz spacing, and have a 100 mW peak transmit power. FIG. 9B illustrates region configuration profile 910 complying with the requirements for a DECT system in the Europe region to reflect European Telecommunications Standards Institute (ETSI) requirements, whereby the mobile communication device is configured to operate in a frequency band of operation between 1880-1900 MHz, utilize ten carriers having 1728 kHz spacing, and have a 250 mW peak transmit power.

FIG. 10 illustrates variation in operating frequency band for a DECT system in several regions, where region data is identified by either country or continent. In further examples, other delineations of region may be used. In the example shown in FIG. 10, each country/continent configuration profile 1002 includes frequency band of operation settings which are implemented at the mobile communication device and the regulatory body setting forth the channel usage requirements.

In one example, the frequency band of operation settings implement 3 parameters in order to control the frequency band: (1) Frequency band offset—the frequency band offset is essentially an index into carrier frequencies that the baseband IC supports, (2) RF carriers used—this selects which of the carrier frequencies are allowed in the system and may include additional masks for extended carriers if supported, and (3) RSSI scan type—this selects different scanning algorithms for channel selection that are required for compliance to Federal Communication Commission (FCC)/American National Standards Institute (ANSI) Unlicensed Personal Communications Services (UPCS) devices standards or similar equivalent region standards. For example, in the Europe region, the standards are set forth by the ETSI. In China, the standards are set forth by the China Quality Certification Centre (CRC)/Office of State Radio Regulatory Commission (SRRC). In Latin America, the standards are set forth in Mexico by the Comisión Federal de Telecomunicaciones (COFETEL). Although one example Frequency band is set forth that is utilized by many of the countries in Latin America, this band may differ for certain countries.

Figure 8B:
FIG. 8B illustrates transmission of safety compliance settings from a computing device to a mobile communication device.

FIG. 8B illustrates transmission of safety compliance settings 72 from a PC 2 to a mobile communication device 18. Safety compliance settings 72 may correspond to settings of an automatic gain control unit at mobile communication device 18. The gain control unit settings actively control the output signal levels to meet TWA (time weighted average) noise exposure limits imposed by regulatory bodies such as the United States Occupational Safety and Health Administration (OSHA) and European Union (EU) Directives.

In further examples, location based mobile communication device settings are not based on regulatory compliance, but based on previously established user preference profiles. For example, mobile communication device settings such as noise reduction, gain, and security may be automatically configured based on detection of user location.

Figure 8C:
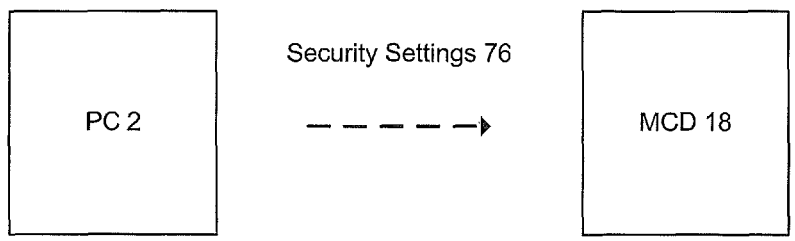
FIG. 8C illustrates transmission of security settings from a computing device to a mobile communication device.

FIG. 8C illustrates transmission of security settings 76 from a PC 2 to a mobile communication device 18. In one example, security settings 76 may correspond to the encryption techniques or level for data communications between PC 2 and mobile communication device 18. In one implementation, security settings 76 provide for a higher setting when the detected use location is a public location.

Figure 11:
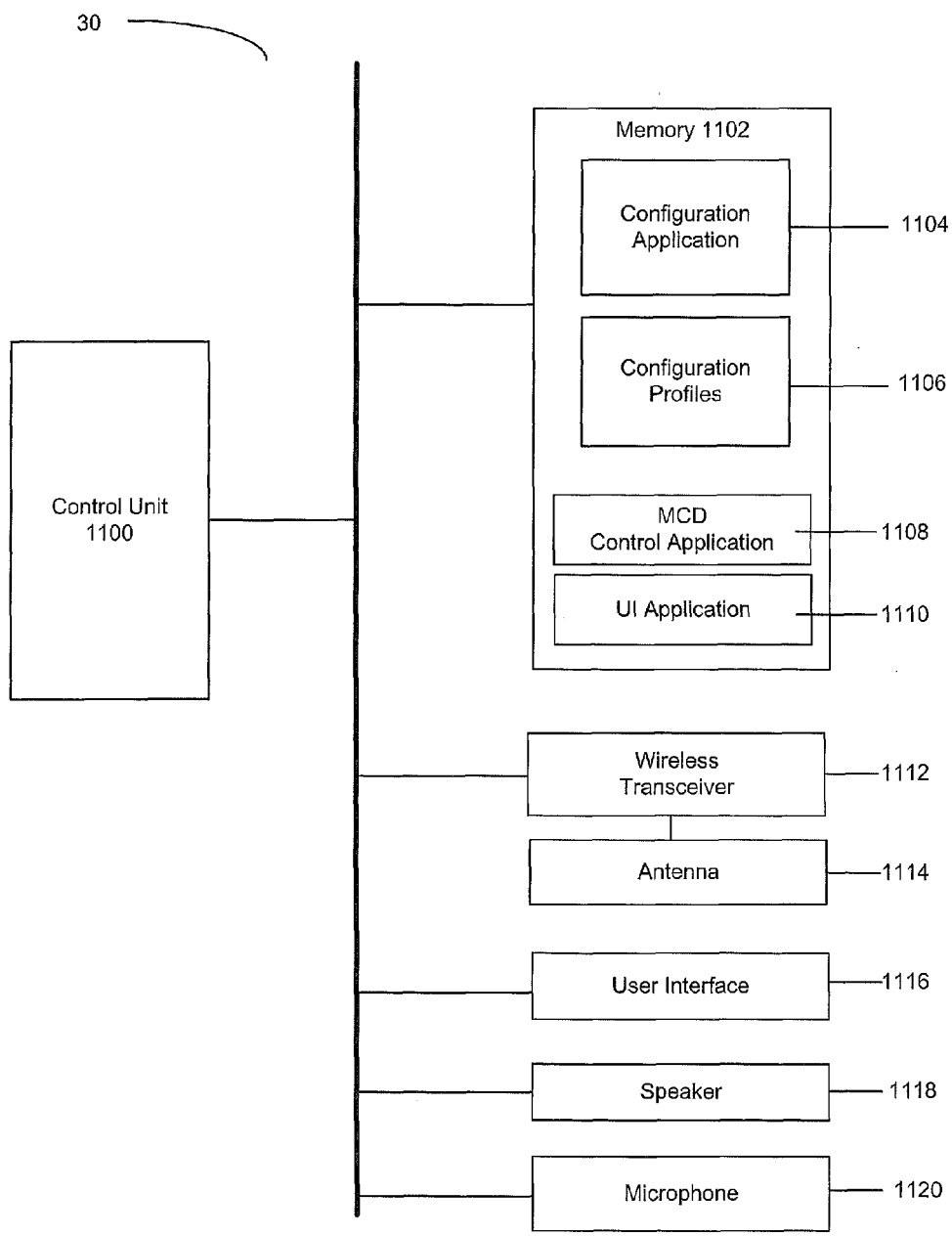
FIG. 11 is a simplified block diagram of the mobile communication device shown in FIG. 2.

FIG. 11 illustrates a simplified block diagram of an example mobile communication device 30 with automatic configuration in one example. Mobile communications device 30 includes a control unit 1100 operably coupled to a memory 1102, a wireless transceiver 1112 using an antenna 1114, a user interface 1116, a speaker 1118, and a microphone 1120. In one example, mobile communication device 30 is a headset and wireless transceiver 1112 is a DECT transceiver adapted for communications with a base unit. In a further example, wireless transceiver 1112 is a Bluetooth transceiver.

Control unit 1100 allows for processing data, in particular managing data between wireless transceiver 1112 and memory 1102 for determining which configuration profile to operate mobile communication device 30. In one example, control unit 1100 is a high performance, highly integrated, and highly flexible system-on-chip (SOC) having signal processing functionality. Control unit 1100 may include a variety of processors (e.g., digital signal processors), with conventional CPUs being applicable.

Memory 1102 may include a variety of memories, and in one example includes ROM, flash memory, or a combination thereof. Memory 1102 may further include separate memory structures or a single integrated memory structure. In one example, memory 1102 may be used to store passwords, network and telecommunications programs, and/or an operating system (OS). Memory 1102 includes a mobile communication device control application 1108 and a user interface application 1110. User interface 1116 allows for manual communication between the device user and the device, and in one example includes an audio and/or visual interface such that a prompt may be provided to the user's ear and/or an LED may be lit.

Memory 1102 stores one or more configuration profiles 1106 and a configuration application 1104 adapted to select and implement a configuration profile from the one or more configuration profiles 1106 responsive to a data retrieval from the base unit. In one example, configuration profiles 1106 include region configuration profiles 36 and configuration application 1104 includes region detection application 34 as illustrated and described previously. In one example, the data retrieval from the base unit includes region data. For example, the region data includes a country code identifier retrieved from a base unit operating system.

The base unit may be a personal computer, a Universal Serial Bus device coupled to a personal computer, or any other device capable of communication with wireless transceiver 1112. The configuration profile may include region specific radio compliance settings, region specific safety compliance settings, or security settings. In one example, the radio compliance settings may include frequency band of operation of the mobile communication device, number of carriers or channels utilized by the mobile communication device, or transmit power of the mobile communication device.

Figure 12:
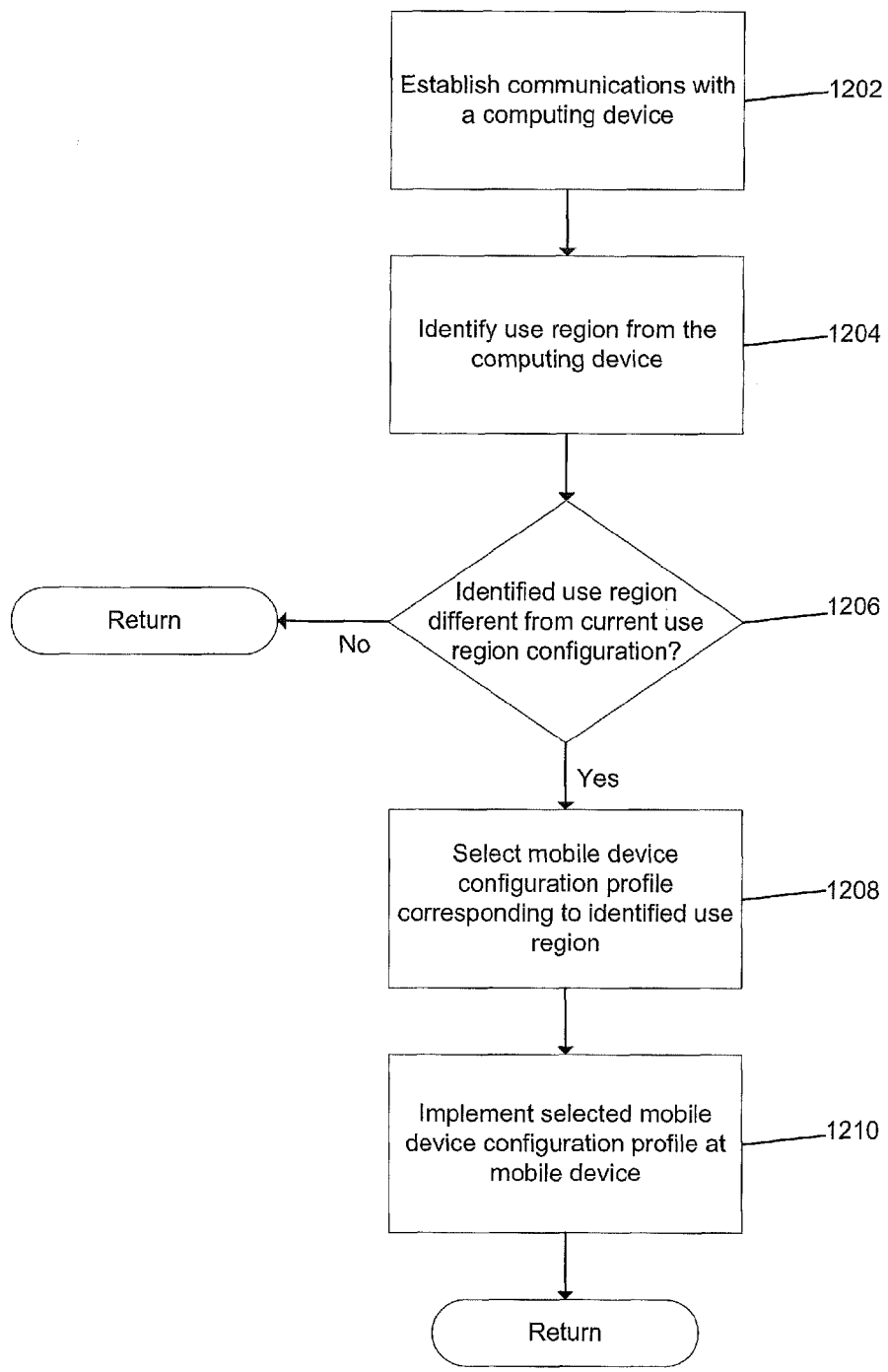
FIG. 12 is a flow diagram illustrating a process for auto-configuration of a mobile communication device in one example.

FIG. 12 is a flow diagram illustrating a process for auto configuration of a mobile communication device in one example. At block 1202, communications are established with a computing device. In one example, establishing communications with a computing device includes forming a wireless communications link between the computing device and the mobile communication device. In a further example, establishing communications with a computing device includes installing a Universal Serial Bus device at the computing device.

At block 1204, a use region is identified from the computing device. In one example, identifying a use region from the computing device includes retrieving a region identifier from an operating system of the computing device. At decision block 1206, it is determined whether the identified use region is different from the current use region configuration. If no at decision block 1206, no configuration update need be initiated and the process returns. If yes at decision block 1206, at block 1208 an appropriate mobile device configuration profile is selected corresponding to the identified use region.

At block 1210, the selected a mobile device configuration profile is implemented at the mobile communication device. In one example, implementing the mobile communication device configuration profile at a mobile communication device includes transmitting one or more settings associated with the mobile communication device configuration profile to the mobile communications device, where the mobile communication device is reconfigured with the one or more settings. The settings may be transmitted in an over-the-air batch file, and a reset command may be sent to the mobile communication device to initiate reconfiguration at the mobile communication device. In a further example, where the mobile communication device stores retrievable configuration profiles, implementing the mobile communication device configuration profile at a mobile communication device includes reconfiguring the mobile communication device with the one or more settings.

In one example, the mobile communication device configuration profile includes region specific radio compliance settings, region specific safety compliance settings, or security settings. The radio compliance settings may include frequency band of operation of the mobile communication device, number of carriers or channels utilized by the mobile communication device, or transmit power of the mobile communication device.

Figure 13A:
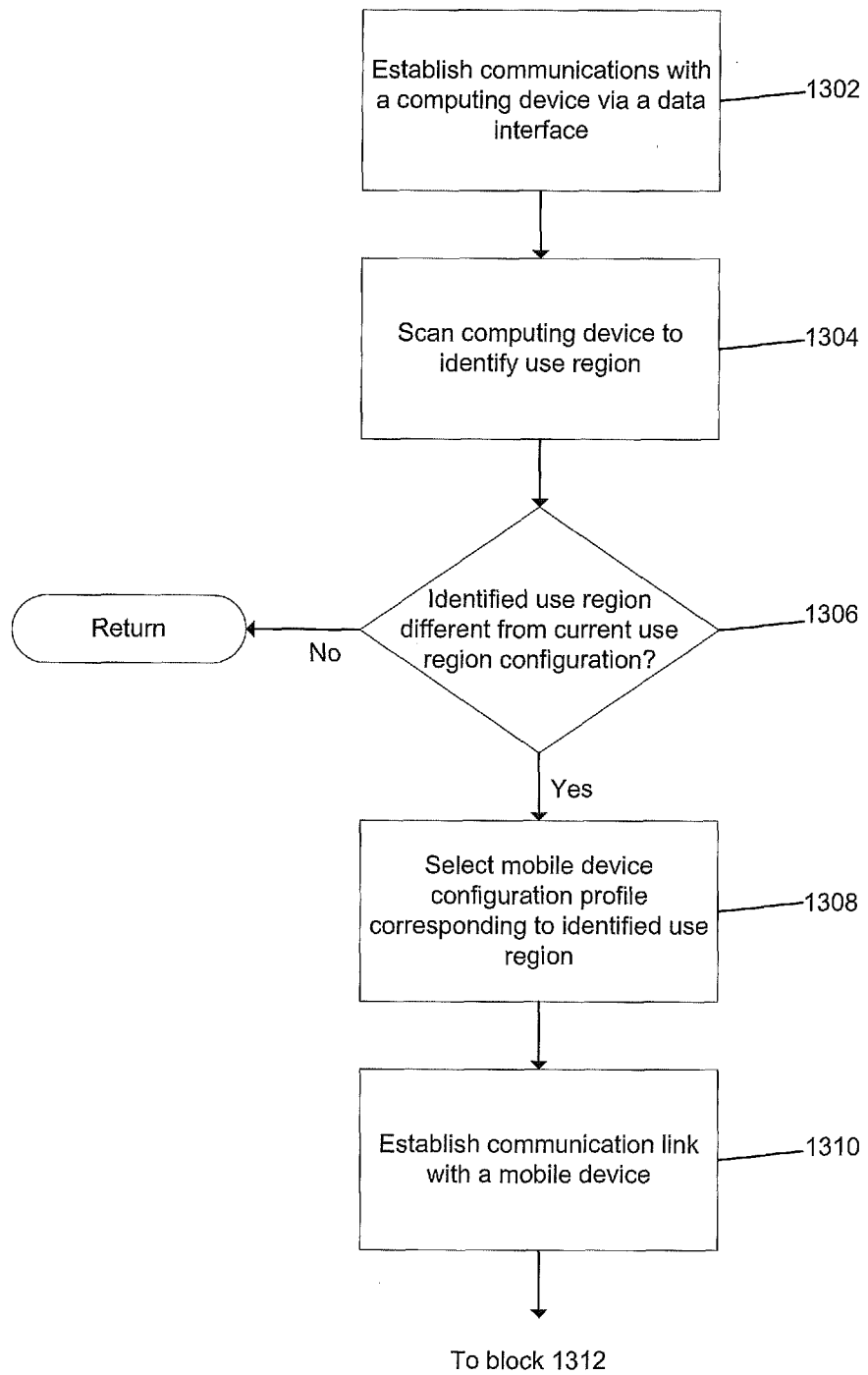
FIGS. 13A and 13B are a flow diagram illustrating a process for auto-configuration of a mobile communication device in a further example.
Figure 13B:
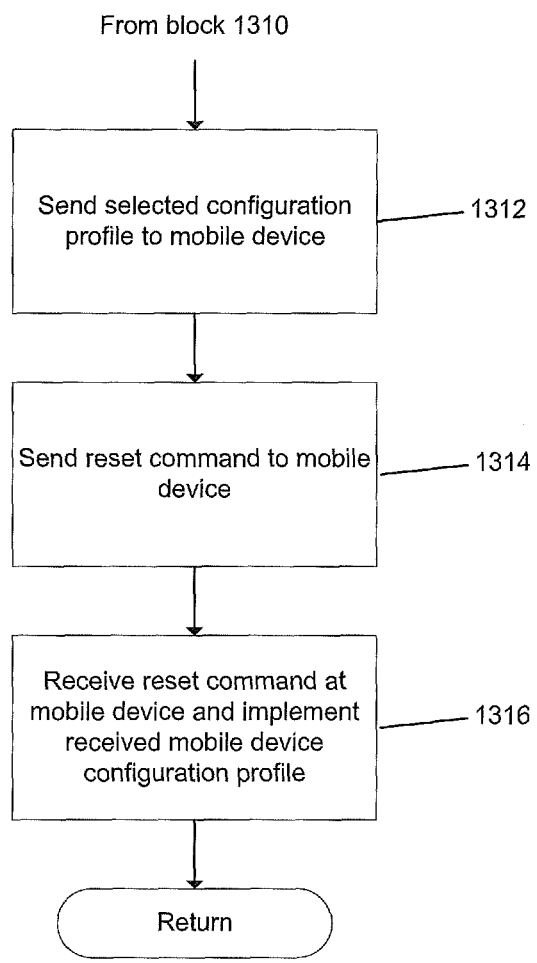

FIGS. 13A and 13B are a flow diagram illustrating a process for auto-configuration of a mobile communication device in a further example. At block 1302, communications are established with a computing device via a data interface. For example, the data interface may be a USB, interface. At block 1304, the computing device is scanned to identify a use region. At decision block 1306, is determined whether the identified use region is different from the current use region configuration. If no at decision block 1306, the mobile communication device need not be reconfigured and the process returns. If yes at decision block 1306, at block 1308 the mobile device configuration profile corresponding to the identified use region is selected.

At block 1310, a communications link is established with the mobile communication device. At block 1312, the selected configuration profile is sent to the mobile communication device. At block 1314, a reset command is sent to the mobile communication device. At block 1316, the reset command is received at the mobile communication device and the received mobile communication device configuration profile is implemented.

While the exemplary embodiments of the present invention are described and illustrated herein, it will be appreciated that they are merely illustrative and that modifications can be made to these embodiments without departing from the spirit and scope of the invention. For example, the type of data interfaces and wireless communication protocols utilized by the devices may be varied. Furthermore, the type of settings stored in the configuration profiles may be varied in further examples. Thus, the scope of the invention is intended to be defined only in terms of the following claims as may be amended, with each claim being expressly incorporated into this Description of Specific Embodiments as an embodiment of the invention.

What is claimed is:

1. A mobile communication device configuration device comprising:
   a Universal Serial Bus interface adapted to interface with a computing device coupled to a communications network;
   a transceiver configured for wireless communications with a mobile communication device; and
   a memory storing two or more region configuration profiles and an application program comprising computer executable instructions configured to detect region data from the computing device following coupling of the Universal Serial Bus interface to a Universal Serial Bus interface at the computing device and responsively select a region configuration profile from among the two or more region configuration profiles, the region configuration profile comprising settings associated with operation of the mobile communication device, wherein the application program further comprises instructions to issue an over-the-air batch file and activation command to auto-configure the mobile communication device with the region configuration profile, instructions to modify a mobile communication device configuration device configuration to match the mobile communication device for security purposes to complete the process, and instructions to implement registration between the mobile communication device configuration device and the mobile communication device, and wherein the region data from the computing device comprises a time zone information, a user information, or a country code identifier.

2. The mobile communication device configuration device of claim 1, wherein the application program is further adapted to reconfigure settings at the mobile communication device configuration following selection of the region configuration profile.

3. The mobile communication device configuration device of claim 1, wherein the application program is further adapted to transmit the region configuration profile to the mobile communication device via the transceiver.

4. The mobile communication device configuration device of claim 1, wherein the computing device is a personal computer and the communications network is an Internet Protocol network.

5. The mobile communication device configuration device of claim 1, wherein the transceiver utilizes a Digital Enhanced Cordless Telecommunications protocol or a Bluetooth protocol.

6. The mobile communication device configuration device of claim 1, wherein the computing device includes an operating system storing region data retrieved by the mobile communication device configuration device.

7. The mobile communication device configuration device of claim 6, wherein the region data is a country code identifier.

8. The mobile communication device configuration device of claim 1, wherein the region configuration profile comprises region specific radio compliance settings, region specific safety compliance settings, or security settings.

9. The mobile communication device configuration device of claim 1, wherein the region configuration profile comprises radio compliance settings comprising frequency band of operation of the mobile communication device, number of carriers or channels utilized by the mobile communication device, or transmit power of the mobile communication device.

10. A method for configuration of a head-worn device comprising:
storing two or more region configuration profiles by a mobile communication device configuration device;
establishing communications with a personal computer;
identifying a use location from the personal computer following coupling of a Universal Serial Bus interface of the mobile communication configuration device to a Universal Serial Bus interface at the personal computer, wherein the identifying is performed utilizing a region data obtained from the personal computer, the region data comprising a time zone information, a user information, or a country code identifier;
selecting a region configuration profile corresponding to the use location;
issuing an over-the-air batch file and activation command to the head-worn device to auto-configure the head-worn device with the head-worn device configuration profile;
implementing the head-worn device configuration profile at the head-worn device,
wherein the head-worn device configuration profile comprises settings associated with operation of the head-worn device;
modifying a configuration device configuration to match the head-worn device; and
implementing registration between the configuration device and the head-worn device for security purposes to complete the process.

11. The method of claim 10, wherein establishing communications with a personal computer comprises forming a wireless communications link between the personal computer and the head-worn device.

12. The method of claim 10, wherein establishing communications with a personal computer comprises installing a Universal Serial Bus device at the personal computer.

13. The method of claim 10, wherein the settings associated with operation of the head-worn device comprise location specific radio compliance settings, location specific safety compliance settings, or security settings.

14. The method of claim 10, wherein identifying a use location from the personal computer comprises retrieving a location identifier from an operating system of the personal computer.

15. The method of claim 10, wherein implementing the head-worn device configuration profile at the head-worn device comprises transmitting one or more settings associated with the head-worn device configuration profile to the head-worn device, wherein the head-worn device is reconfigured with the one or more settings.

16. The method of claim 10, wherein implementing the head-worn device configuration profile at the head-worn device comprises reconfiguring the head-worn device with the one or more settings.

17. The method of claim 10, wherein the personal computer comprises a laptop computer.

18. A mobile communication device comprising:
a processor;
a microphone;
a speaker;
a short range wireless transceiver adapted for communications with a configuration device in proximity to the mobile communication device utilizing a short range wireless communications protocol, wherein the configuration device stores two or more region configuration profiles and an application program comprising computer executable instructions configured to detect region data from a personal computer following coupling of a Universal Serial Bus interface of the configuration device to a Universal Serial Bus interface at the personal computer and responsively select a region configuration profile from among the two or more region configuration profiles, the region configuration profile comprising settings associated with operation of the mobile communication device; and
a memory storing a configuration application comprising instructions to receive an over-the-air batch file and activation command from the configuration device to auto-configure the mobile communication device with the region configuration profile, and instructions to implement registration between the configuration device and the mobile communication device for security purposes to complete the process, the region data comprising a time zone information, a user information, or a country code identifier, the configuration device further modifying a configuration device configuration to match the mobile communication device.

19. The mobile communication device of claim 18, wherein the short range wireless transceiver utilizes a Digital Enhanced Cordless Telecommunications protocol or a Bluetooth protocol.

20. The mobile communication device of claim 18, wherein the configuration profile comprises region specific radio compliance settings, region specific safety compliance settings, or security settings.

21. The self-configuring mobile communication device of claim 18, wherein the configuration profile comprises radio compliance settings comprising frequency band of operation of the mobile communication device, number of carriers or channels utilized by the mobile communication device, or transmit power of the mobile communication device.

22. The mobile communication device of claim 18, wherein the personal computer comprises a laptop computer.

\* \* \* \* \*